US007055411B2

(12) United States Patent
Huang

(10) Patent No.: US 7,055,411 B2
(45) Date of Patent: Jun. 6, 2006

(54) RATCHET COUPLING MEANS FOR A DRIVING TOOL

(76) Inventor: Daniel Huang, P.O. Box 697, Fongyuan City, Taichung County (TW) 420

( * ) Notice: Subject to any disclaimer, the term of this patent is extended or adjusted under 35 U.S.C. 154(b) by 0 days.

(21) Appl. No.: 10/983,626

(22) Filed: Nov. 9, 2004

(65) Prior Publication Data

US 2006/0096422 A1 May 11, 2006

(51) Int. Cl.
*B25B 25/00* (2006.01)
*F16D 11/06* (2006.01)

(52) U.S. Cl. ........................ 81/63.1; 81/58.4; 81/58.3; 192/43.2

(58) Field of Classification Search ................ 81/63.1, 81/58.4, 58.3, 60, 62, 63, 438; 192/43.2, 192/43

See application file for complete search history.

(56) References Cited

U.S. PATENT DOCUMENTS 3,651,718 A * 3/1972 Thomasian .................. 81/480
5,582,081 A * 12/1996 Lin ............................ 81/63.1
5,687,820 A * 11/1997 Lin ........................... 192/43.2
6,047,617 A * 4/2000 Chen .......................... 81/63.1
6,622,597 B1 * 9/2003 Chen .......................... 81/58.3
6,644,147 B1 * 11/2003 Huang ........................... 81/62
6,935,211 B1 * 8/2005 Chen .......................... 81/58.4
2002/0079181 A1 * 6/2002 Hsiao ........................ 192/43.2
2002/0102143 A1 * 8/2002 Huang .................... 408/241 R
2003/0126958 A1 * 7/2003 Ping ........................... 81/63.1

* cited by examiner

*Primary Examiner*—Lee D. Wilson
*Assistant Examiner*—Alvin J. Grant

(57) ABSTRACT

An improvement in ratchet coupling means of a driving tool includes a driving member inserted into a handle and covered by a control ring, a ratchet ring and a circular cap, a pair of springs biase the checking blocks in the driving member each having teeth on the sloped surface engaged in the teeth of the ratchet ring and selectively operated by four diagonally arranged stir bars in the control ring which further has three separate positioning grooves respectively engageable within a spring biased steel ball from the driving member for permitting the ratchet driving tool to conduct three fastening modes by its hexagonal socket wrench. A phillips tipped hexagonal shank may be secured to the driving tool by necessary components to change the socket wrench into a screwdriver.

3 Claims, 10 Drawing Sheets

RATCHET COUPLING MEANS FOR A DRIVING TOOL

BACKGROUND OF THE INVENTION

The present invention relates to the ratcheted driving tools and more particularly to an improvement in ratchet coupling means for a driving tool.

As we know that a ratchet checking structured driving tool provides great convenience. This driving tool can fasten or unfasten a bolt or its equivalents by rotating it clockwise, counterclockwise and/or idle running backward. FIG. 1 shows a ratcheted wrench which uses a swivel bottom 1 to control a stir rod 2. The stir rod 2 is biased by a spring 3 and pushes a ratchet plate 4 becoming oblique on single direction and checking the teeth of the ratchet 5 to enable the driving rod 6 to be rotated on single direction so as to drive a working piece. But the torque of this type of ratchet socket wrench is not so strong and easy to jump off.

FIGS. 2 and 3 show an structurally improved prior art ratchet driving tool which has a control ring 11, a ratchet ring 12, a driving rod 13 and a pair of checking rods 14 and 15. The control ring 11 has a pair of grooves 111 and 112 for receiving one end of the checking rods 14 and 15 which have the U-shaped body and each is biased by a spring 16. The driving rod 13 has a recess for receiving a spring 131 and a steel ball 132 which can be respectively engaged within three semi-circular grooves 113, 114 and 115 of the control ring 11 to enable the driving rod 13 to perform three stepped rotation (clockwise, counterclockwise and/or idle running) and is controlled by the stretching or contracting actions of the checking rods 14 or 15 alternately checked the ratchet ring 12. Due to the springs 16 are positioned at the middle portion of the checking rods 14 and 15 which may cause an unbalance to affect the certainty of the checking action between the checking rods 14 or 15 and the ratchet ring 12. Besides, each time only enables one of the two checking rods 14 or 15 to check the ratchet ring 12, the torque is still not strong enough as expected.

SUMMARY OF THE PRESENT INVENTION

The present invention has a main object to provide an improvement in ratchet coupling means for a driving tool in which four checking blocks are added and symmetrically arranged on pair by pair basis so as to intensify torque double in comparison with the prior art.

Another object of the present invention is to provide an improvement in ratchet coupling means for a driving tool in which the four checking blocks can ensure the structural stability and keep the elements thereof not to be biased but exactly checking the ratchet wheel without jumped off.

Further object of the present invention is to provide an improvement in ratchet coupling means for a driving tool in which a stretching and contractible driving shank is added to perform a lengthy adjustment.

Accordingly, the improvement in ratchet coupling means for a driving tool of the present invention comprises generally a driving member connected to the stepped central bore of a handle and enables a control ring disposed on its middle portion and a ratchet ring sleeved on the front end thereof.

The driving member has formed on front opposite sides a pair of flat receiving spaces and an elastic steel ball disposed in a lateral side and a pair of steel balls in front end. The control ring has four protrudent stir bars diagonally arranged in inner periphery in addition to three positioning grooves to receive the steel ball from the lateral side of the driving member.

The four checking blocks are separated into two pairs each of which has a recess facing one another for anchoring two end of a spring, each pair of the checking blocks are disposed in one of the receiving spaces of the driving member, a cap shaped ratchet ring sleeved to the front end of the driving member having ratchet teeth in inner periphery engaged with the teeth of the checking blocks and a hexagonal socket wrench on front side and a cap on the foremost front of the driving tool engaged with the control ring and having a central bore to permit the socket wrench to pass through and to stretch out of the driving tool. Thereby, to rotate the control ring to disengage a pair of the checking blocks on diagonal positions with ratchet ring and the other checking blocks are still engaged with the ratchet ring so as to enable the driving tool to conduct the three ways rotations to fasten or unfasten a working object. This improvement has achieved an intensification of the torque and the reliable engagement of the components.

The present invention will become more fully understood by reference to the following detailed description thereof when read in conjunction with the attached drawings.

DETAILED DESCRIPTION OF THE PREFERRED EMBODIMENT

Figure 1:
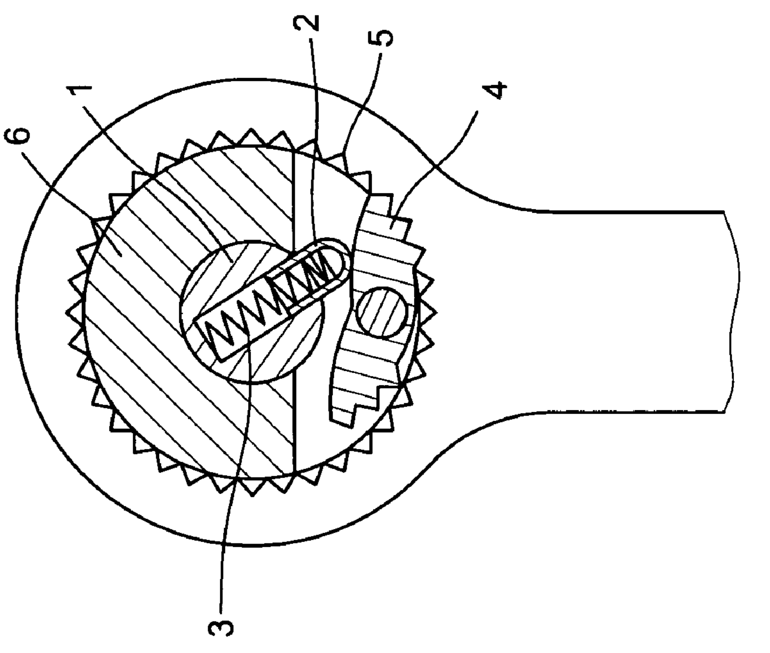
FIG.1 Prior Art
FIG. 1 is a sectional view to show a ratchet socket wrench according to a prior art.
Figure 2:
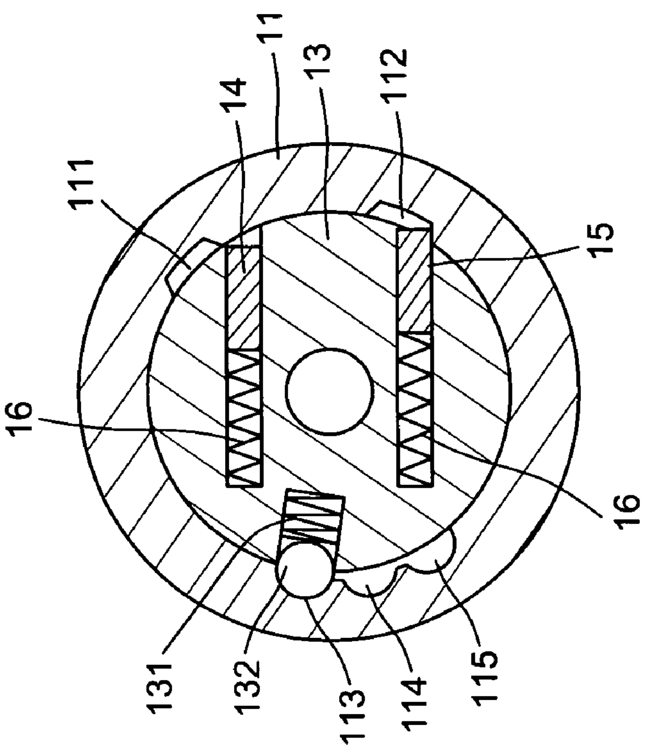
FIG.2 Prior Art
FIG. 2 is a sectional view to show a double checking rods in a driving tool according another prior art.
Figure 3:
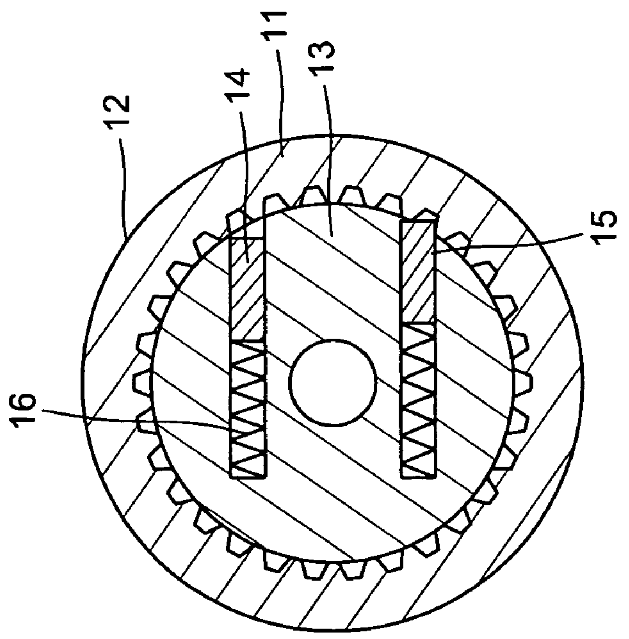
FIG.3 Prior Art
FIG. 3 is a sectional view to show a double checking rods checking a ratchet according to still another sample of the above prior art.
Figure 4:
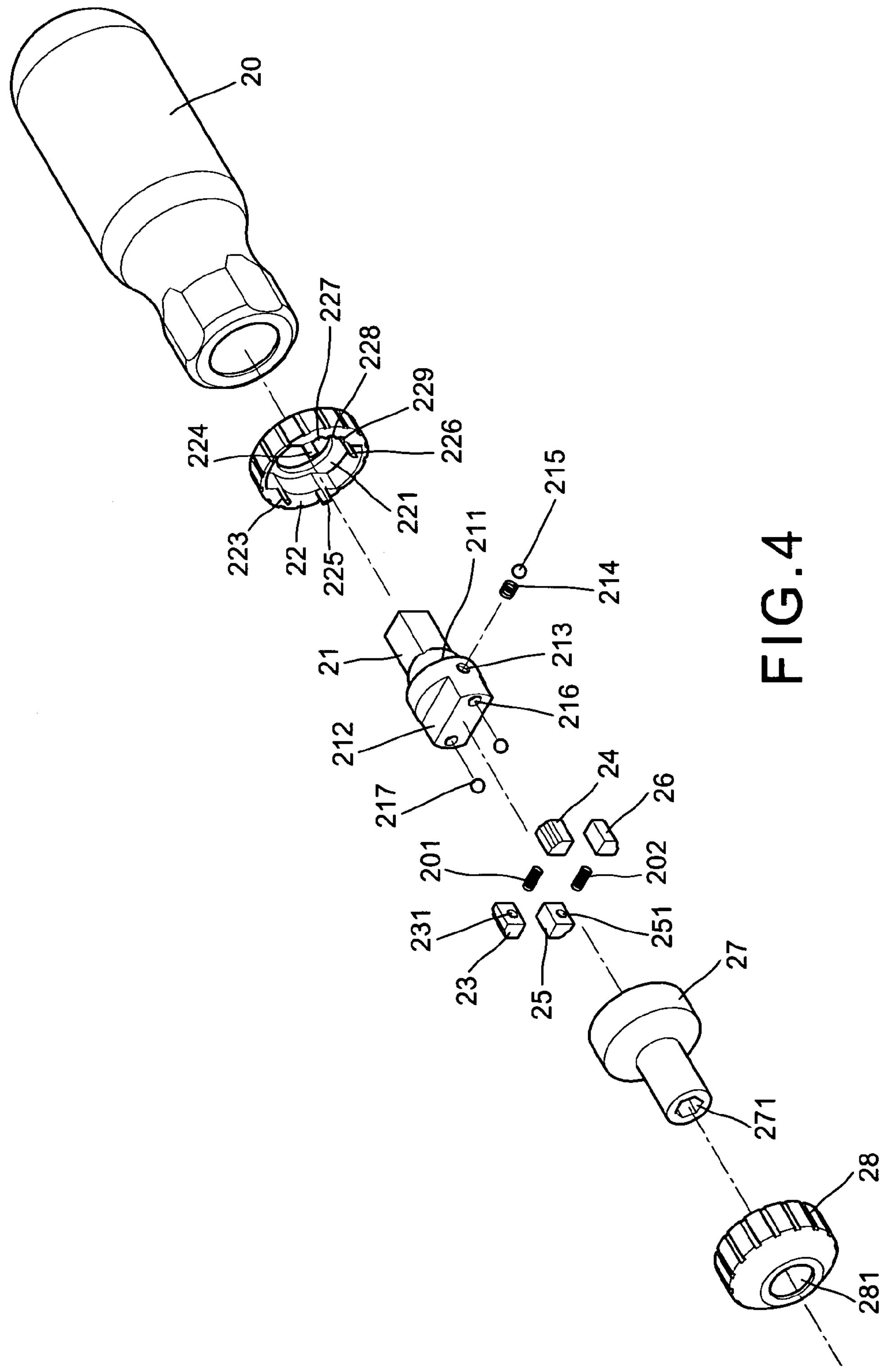
FIG. 4 is an exploded perspective view to show the preferred embodiment of a ratchet driving tool according to the present invention.
Figure 5:
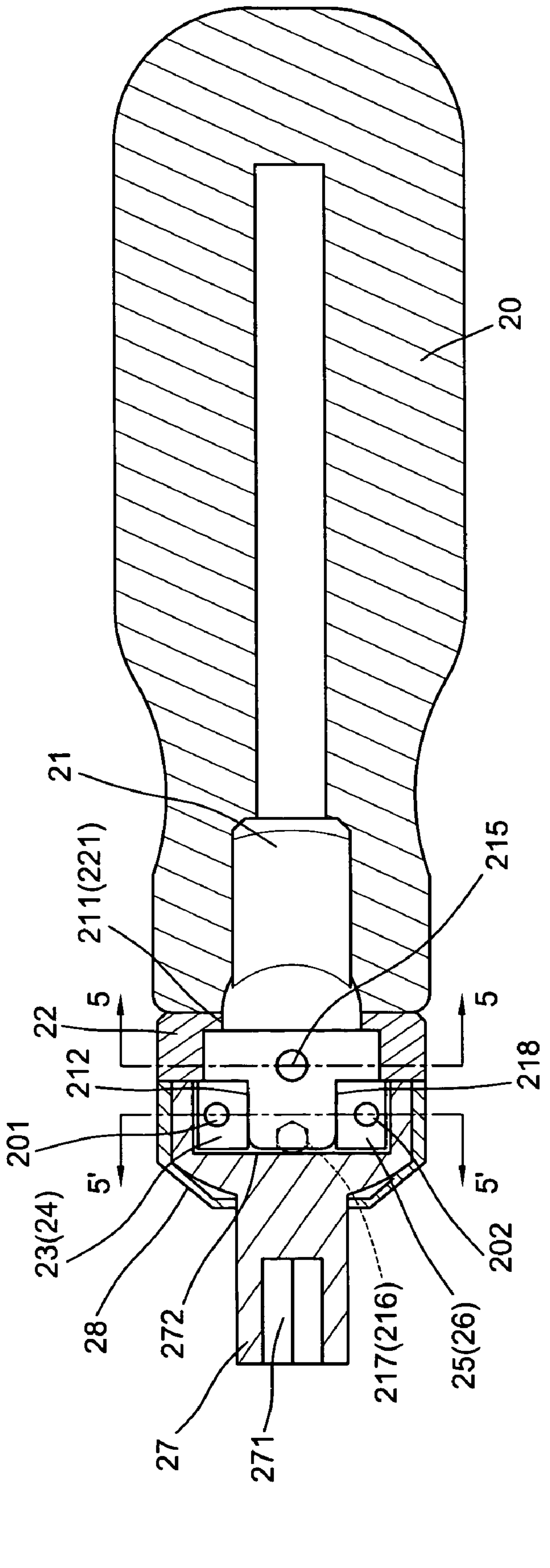
FIG. 5 is a sectional view to show the assembly of FIG. 4.
Figure 6:
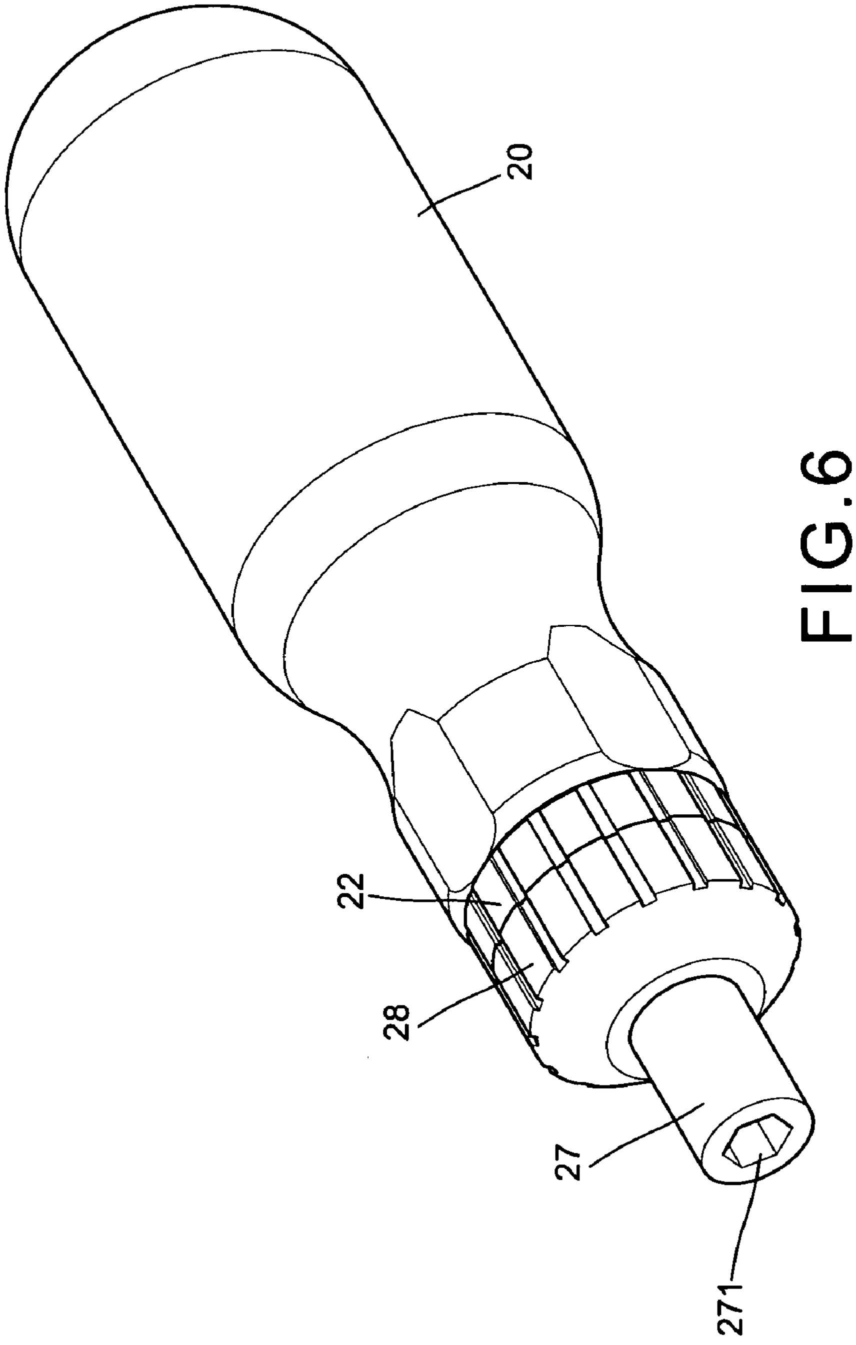
FIG. 6 is a perspective view of FIG. 5.

With reference to the drawings and initiated from FIGS. 4 to 8, the improvement in ratchet coupling means for a driving tool of the present invention comprises a handle 20 having a stepped central bore, a driving member 21 having a rectangular rear end fixed into the central bore of the handle 20, a retaining ring 211 on a middle portion engaged within a circular depression in a control ring 22 which surrounds the driving member 21 without sliding out, a flat rectangular front end to form a pair of receiving spaces 212 and 218 on the top and the underside thereof each receives a pair of checking blocks 23, 24, 25 and 26.

The checking blocks 23, 24, 25 and 26 each has a circular recess 231, 241, 251 and 261 in inner side facing each other, wherein the blocks 23 and 24 are biased by a spring 201 and the blocks 25 and 26 are biased by a spring 202 therebetween, a circular recess 213 in a left side of the driving member 21 engaged with a spring 214 and a steel ball 215 and a pair circular recess 216 spacedly formed in the flat rectangular front end respectively engaged with a pair of steel balls 217. The control ring 22 further has a plurality of stir bars 223, 224, 225 and 226 spacedly and diagonally formed on inner periphery for respectively stirring the checking blocks 23, 24, 25 and 26 each of which has teeth on sloped surface engageable with the teeth of the ratchet ring 27. In the inner periphery of the control ring 22 further has three positioning grooves 227, 228 and 229 formed spaced apart for selectively positioning the steel ball 215 of the driving member 21. The cap shaped ratchet ring 27 sleeved onto the driving member 21 having teeth on inner periphery enabling to stop against the checking blocks 23, 24, 25 and 26 and a hexagonal socket wrench 271 centrally projected foreward from the front surface thereof, and a circular cap 28 covering the ratchet ring 27 and connected with the control ring 22 by means of high frequency welding and having a central bore 281 for permitting the hexagonal socket wrench passing through and stretching out of the cap 28.

Figure 7:
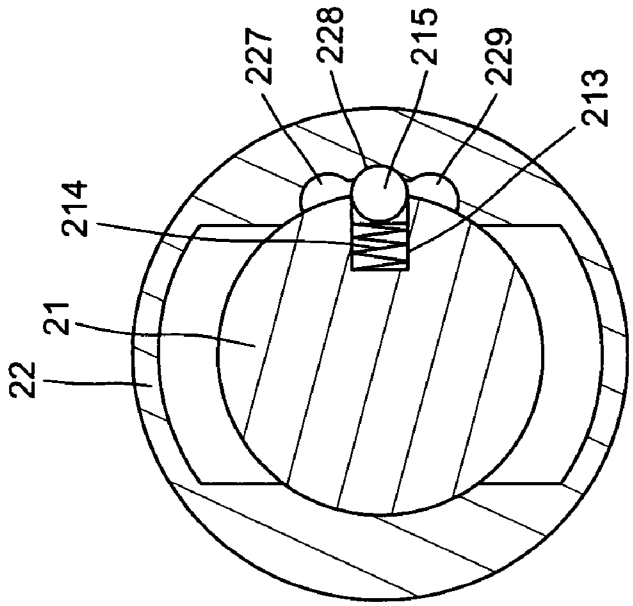
FIG. 7 is a sectional view taken along line 5—5 of FIG. 5.
Figure 8:
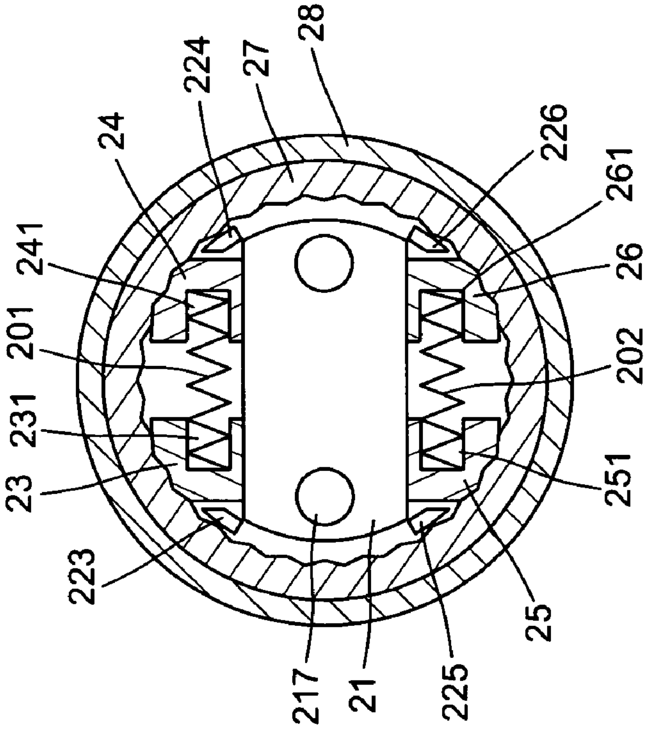
FIG. 8 is a sectional view taken along line 5'—5' of FIG. 5.
Figure 9:
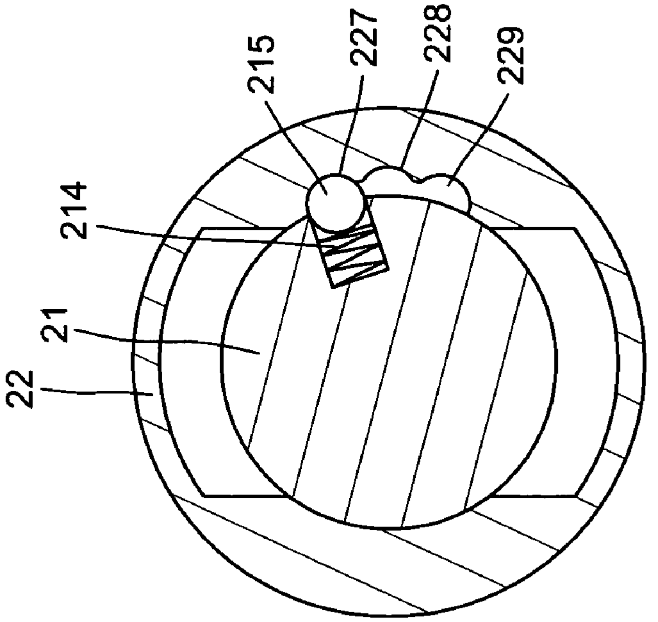
FIG. 9 is a sectional view indicating the rotation of the control ring.
Figure 10:
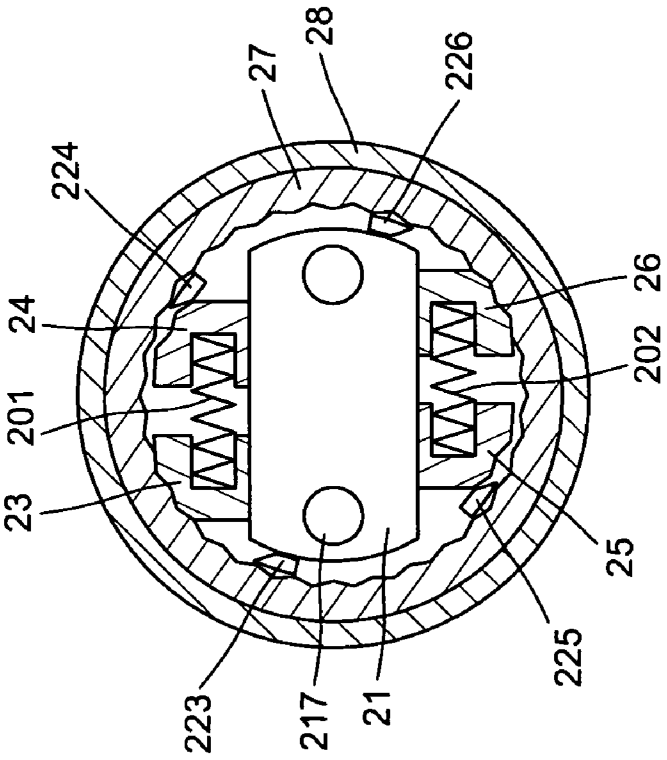
FIG. 10 is a sectional view indicating the action of the check blocks.

In operation, engage the socket wrench onto a working object and rotate the control ring 22 for a distance (as shown in FIG. 9). When the steel ball 215 engaged with the positioning groove 227, the pair of stir bars 224 and 225 which are diagonally positioned in the control ring 22 stir the checking blocks 24 and 25 disengaging their teeth with the teeth of the ratchet ring 27, but the teeth of the checking blocks 23 and 26 still remain engaged with the teeth of the ratchet ring 27 (as shown in FIG. 10). Meanwhile the ratchet driving tool can be able to rotate clockwise to fasten the working piece and to be idle running counterclockwise. On the contrary, if the steel ball 215 is positioned within the positioning groove 229, the ratchet driving tool may rotate counterclockwise to unfasten a working piece and to be idle running clockwise. Further, if the steel ball is in the positioning groove 228 (as shown in FIGS. 7 and 8) all the stir bars 223, 224, 225 and 226 are in stationary and the teeth of the checking blocks 23, 24, 25 and 26 are all engaged with the teeth of the ratchet ring 27. So that the socket wrench is in a fixed status.

Figure 11:
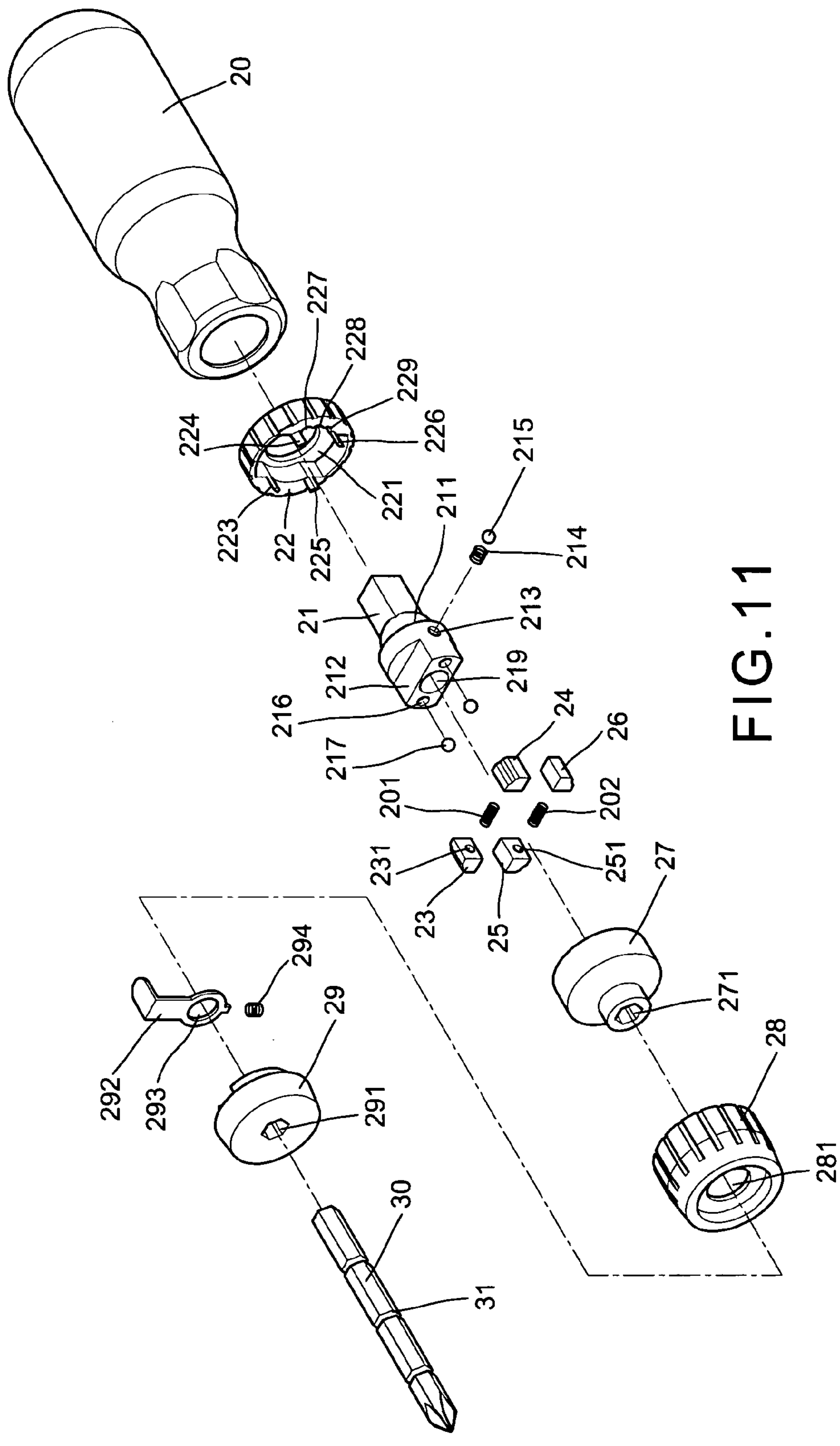
FIG. 11 is an exploded perspective view to show an additional shank and the related elements engaged to the front end of the preferred embodiment.
Figure 12:
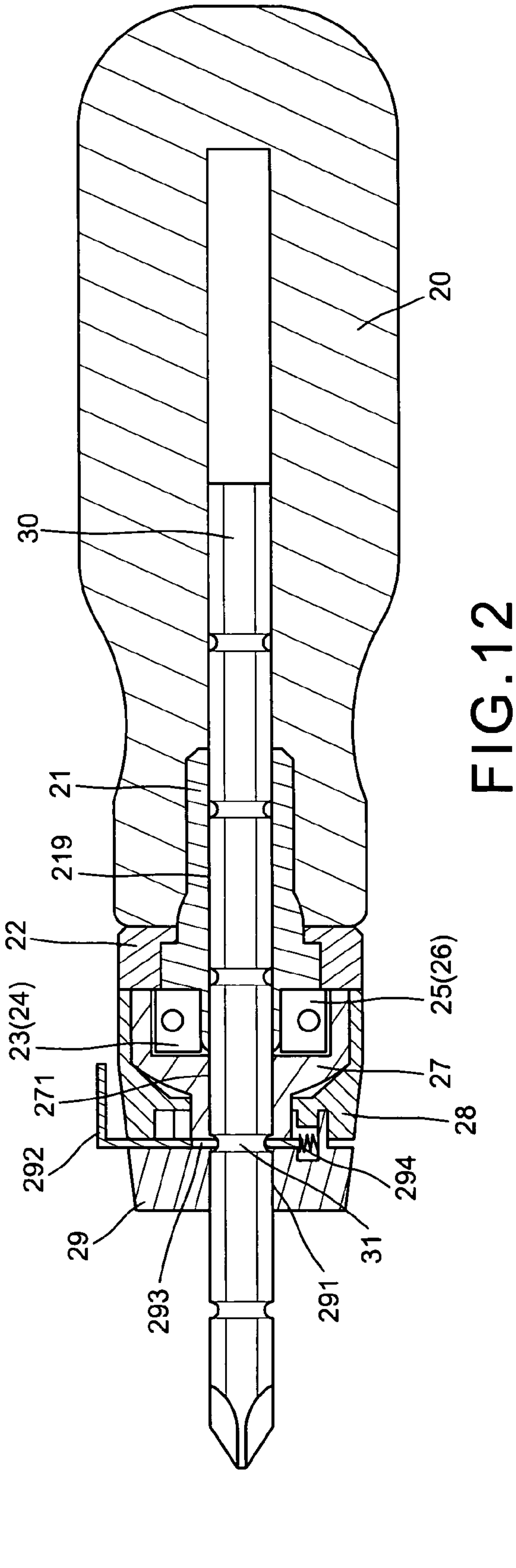
FIG. 12 is a sectional view to show the additional shank already engaged with the ratchet driving tool of the present invention.
Figure 13:
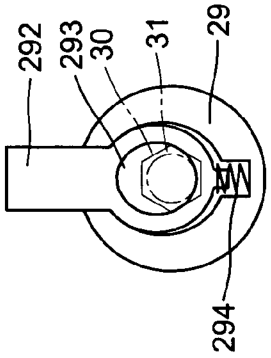
FIG. 13 is a plane view to show the engagement of the checking cap, the press plate and the shank.
Figure 14:
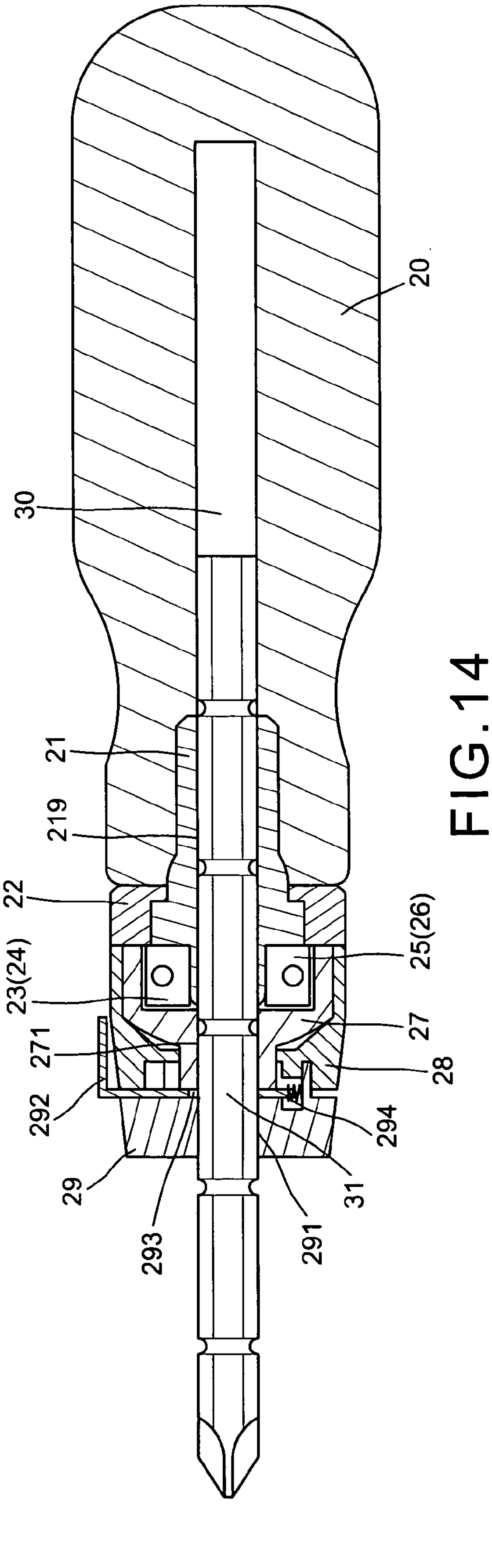
FIG. 14 is a sectional view to show that the press plate is pressed downward.
Figure 15:
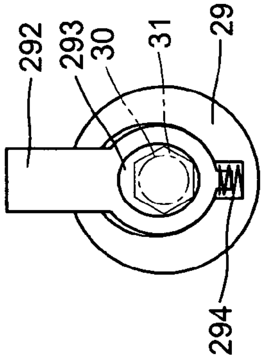
FIG. 15 is a plane view to show the disengagement of the press plate with the shank.

Referring to FIGS. 11 to 13, additional elements such as a hexagonal shank 30, a checking cap 29 and a L-shaped press plate 292 may be engaged with the ratchet driving tool. However, a central bore 219 has to be formed in the driving member 21 and the ratchet ring also adds a through hole so as to permit the rear end of the hexagonal shank 30 to enter into the central bore of the handle 20. The hexagonal shank 30 has a plurality of annular grooves 31 spacedly formed in the body and a phillips tip at free end. The checking cap 29 has a hexagonal central bore 291 and an arcuate extension on the back side.

The L-shaped press plate 292 has a retaining ring 293 at lower end. When assembling, sleeve the checking cap 29 and the L-shaped press plate 292 sequentially on the shank 30, then insert the shank 30 into the handle 20 through the cap 28, the ratchet ring 27, the driving member 21 and the control ring 22 and then engage the extension of the checking cap 29 into a depressed front end of the cap 28 and engage the retaining ring 293 of the L-shaped press plate 292 into one of the annular grooves 31 and the retaining ring 293 is biased by a spring 294 which has a lower end stopped against the arcuate extension of the checking cap 29. When press the L-shaped press plate 292 downward, the retaining ring 293 is automatically disengaged with the annular groove 31 so as to allow the shank 30 to move slidably and/or to remove from the driving tool. The addition of the shank 30 does not affect the three stepped rotation functions of the driving tool.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. An improvement in ratchet coupling means for a driving tool comprising:

a handle having a stepped central bore;

a driving member having a retaining ring at middle portion engaged with a circular depression in a control ring, a rectangular rear end inserted into the stepped central bore of said handle, a flat rectangular front end defined a pair of receiving spaces on top and underside for respectively receiving two pairs of checking blocks each of which has a first circular recess facing each other for respectively anchoring two ends of a pair of first springs and teeth on a sloped surface, a second circular recess in a lateral side for anchoring a second spring and a first steel ball and a pair of third recesses formed spaced apart in fore side of the flat rectangular front end for anchoring a pair of second steel balls respectively, said control ring having four stir bars diagonally positioned on inner periphery in addition to three separate positioning grooves formed therebetween;

a cap shaped ratchet ring sleeved onto said driving member having teeth on an inner periphery engageable with the teeth of said checking blocks and a hexagon socket wrench centrally projected foreward from a front surface;

a circular cap covering said ratchet ring, said driving member and eventually engaged with said control ring and connected by means of high frequency welding and having a central bore to permit said hexagon socket wrench passing through and projecting from said ratchet driving tool;

thereby, rotating said control ring a distance to allow said ratchet driving tool to conduct a three-way fastening and unfastening a working object.

2. The improvement as recited in claim 1, wherein said driving member further has a central bore and said ratchet ring further has a through hole communicating with said hexagon socket wrench.

3. The improvement as recited in claim 1, further has a diagonal shank which has a plurality of annular grooves formed in outer periphery and a phillips tip, may be inserted into said handle through said circular cap, said ratchet ring, said driving member and said control ring and secured by a L-shaped press plate which has a retaining ring engaged into one of said annular grooves and biased by a spring on lower end and stopped against an arcuate extension on rear side of a checking cap which is engaged with a depressed front end of said circular cap.

* * * * *